April 12, 1938.                M. R. KONDOLF                 2,114,024
                             SPEED DETERMINATION
                    Original Filed May 26, 1930    3 Sheets-Sheet 1

INVENTOR
Mathias R. Kondolf

April 12, 1938.  M. R. KONDOLF  2,114,024
SPEED DETERMINATION
Original Filed May 26, 1930   3 Sheets-Sheet 2
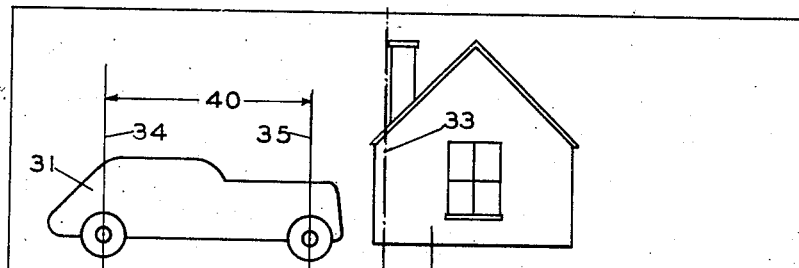
FIG. 4
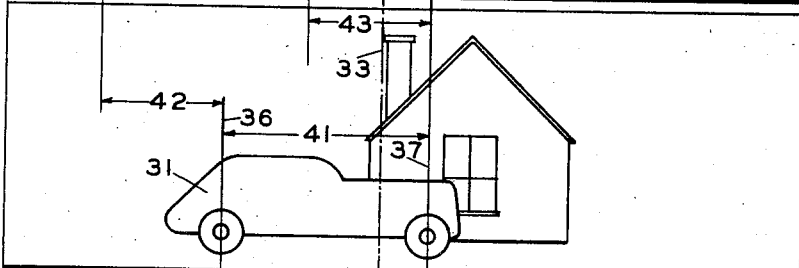
FIG. 5
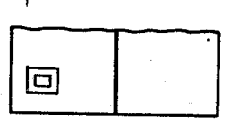
FIG. 6
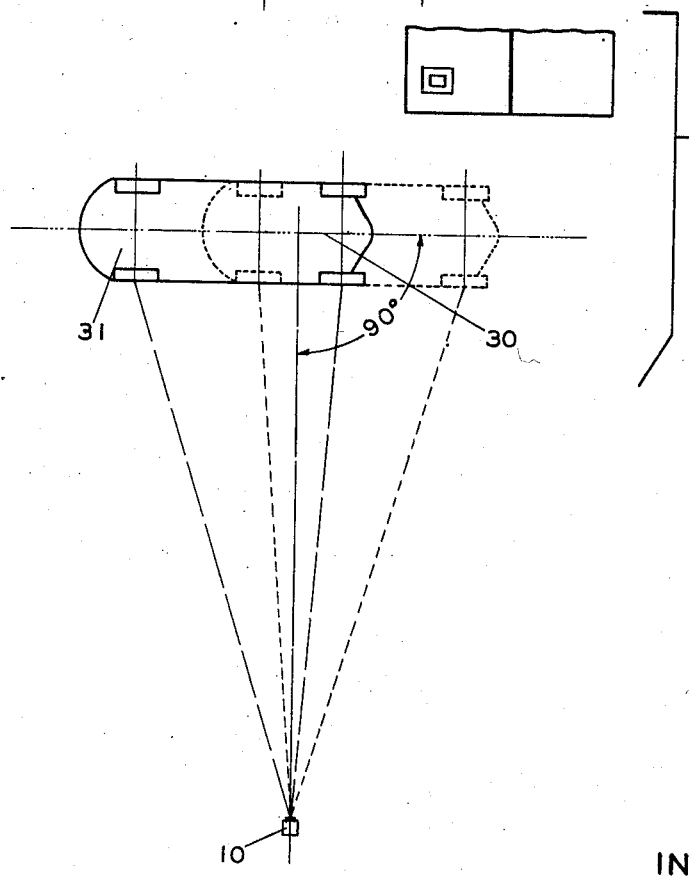
INVENTOR
Mathias R. Kondolf April 12, 1938.   M. R. KONDOLF   2,114,024
SPEED DETERMINATION
Original Filed May 26, 1930    3 Sheets-Sheet 3
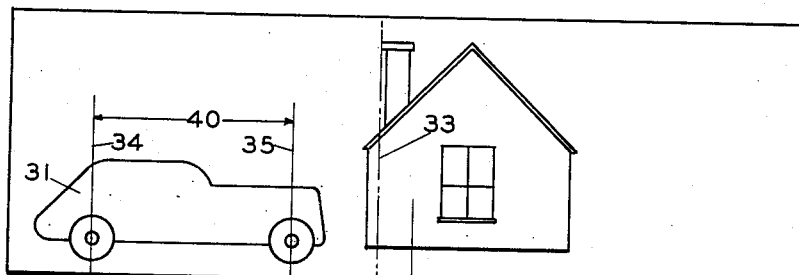
FIG. 7
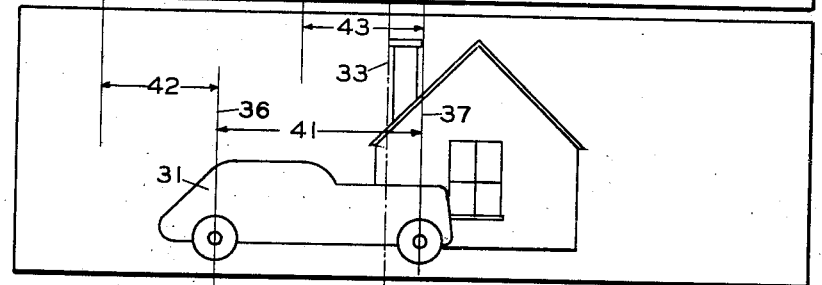
FIG. 8
FIG. 9
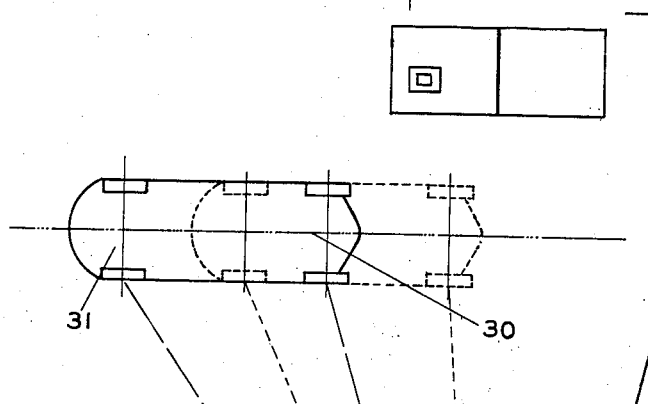
INVENTOR
Mathias R. Kondolf Patented Apr. 12, 1938

2,114,024

UNITED STATES PATENT OFFICE 2,114,024

SPEED DETERMINATION

Mathias R. Kondolf, New Canaan, Conn.

Continuation of application Serial No. 455,588, May 26, 1930. This application October 15, 1937, Serial No. 169,276

11 Claims. (Cl. 33—46)

This invention relates to an improved method of determining the rate of motion or speed of automobiles.

The regulations governing the speed of automobiles on the highways and at particular points of danger, such as at road intersections, curves, schools, railroad crossings, etc. are made to protect all parties using the highways and are generally regarded as being most desirable and necessary when properly and impartially enforced.

While speed is not the sole cause of motor vehicle accidents, it is generally agreed that excessive speed at dangerous points, or with dangerous road conditions, is one of the chief factors in the ever growing toll of death and injury, as well as property damage, resulting from motor vehicle operation.

It is believed that a large proportion of accidents are caused by careless or thoughtless driving and the present method lends itself to the education of such drivers by the sending of notices of speed violations which have been recorded.

The personal element enters largely into the ordinary methods used in ascertaining speed and consequently into the truth or falsity of the evidence presented—whether it is the claimed reading on a speedometer of a pursuing officer; or the claimed time taken for the alleged speeder to cover a measured course.

Cases have been known where law abiding drivers of automobiles have been fined upon the mere statement of a police officer to the effect that the motorist was driving at an illegal rate of speed around a curve, or past a street intersection.

Evidence obtained by the usual methods, not being concrete or tangible but simply notations or averments of the officers, (who may even be directly or indirectly interested in the number of convictions obtained) is naturally open to suspicion of prejudice—and often results in disrespect for speed laws which are enforced by such methods.

A principal object of the present method is to provide tangible factual evidence of the speed of automobiles which evidence is not subject to the personal element of the operator, and may be re-checked at any time.

An important object of the invention is to provide a photographic method of speed determination which compensates for movement of the camera during the interval of time between exposures.

An object of the invention is to provide a method of speed determination which will also serve to identify the location of the automobile at the time.

An object of the invention is to provide a method of speed determination which is not dangerous to the operator.

An object of the invention is to provide a method of speed determination which is adapted to ascertain the speed under frequently met road conditions, such as cars traveling in close line, cars turning corners, entering streets past "Stop" signs, crossing white lines at hill tops and curves.

Additional features of the invention comprise the ability to determine speed with slight chance of detection by the driver; to determine speed within a very short movement of the automobile; to determine speed from a wide range of angular positions in relation to the line of motion of the automobile; to determine speed from points either below or far above the street surface, such as from building windows; and to provide pictorial evidence of the make and model of the automobile.

The method comprises the following steps.

(a) Taking an initial photograph of the side of the automobile and including in said picture a definite background.

(b) Taking a second photograph of the side of the automobile after a known time interval and including said background in said second picture.

(c) Combining and orienting the two photographs so that a straight gauge line may be drawn across the combination picture and will intersect corresponding points in each photograph.

(d) Drawing lines parallel to said gauge line and passing through definite visible points of each automobile image (such as wheel centers).

(e) Measuring directly from said combination picture the separation of said parallel lines intersecting each image and comparing the average of the two measurements with the known dimension of the automobile between said visible points (thus, separation of wheel centers equals wheel base of automobile) to ascertain the "scale" or proportion which said combination picture bears to the actual dimensions of said automobile.

(f) Measuring directly from said combination picture the average pictured distance as shown moved by said automobile during the interval between the taking of the pictures, and utilizing the "scale" of the combination picture to compute the actual distance moved by said automobile during this known interval.

(g) Using the distance moved and the known time interval as factors to compute the velocity or rate of speed of the automobile.

To these and other ends the characteristic features and advantages of my improvements will more fully appear in the following description and the accompanying drawings in illustration thereof.

In the drawings, in which like reference numerals designate like parts:

Figure 1:
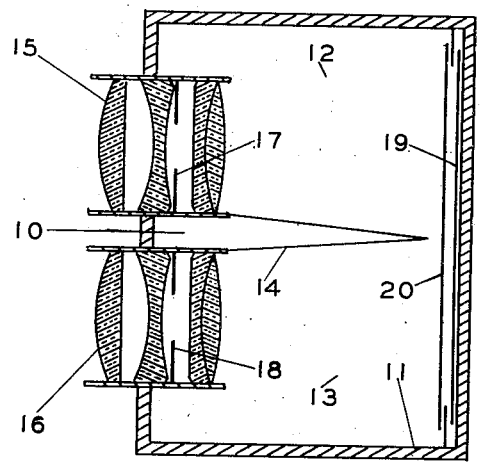
Fig. 1 represents a vertical cross section through one form of camera adapted to carry out my method.
Figure 3:
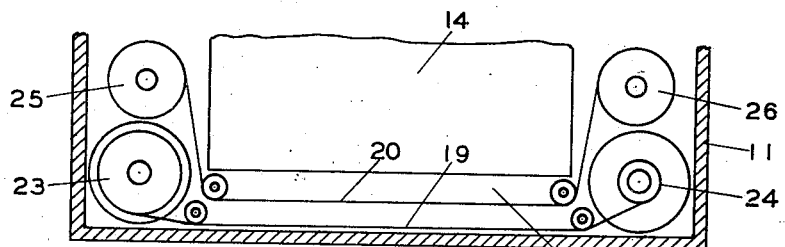

Fig. 3, which is partly in cross section, shows a horizontal section through the camera of Fig. 1.

Figs. 4 and 5 diagrammatically represent the first and second individual photographs taken by a camera placed as shown in Fig. 6.

Fig. 6 is a plan view showing location of camera at right angles to the line of motion of automobile.

Figs. 7 and 8 diagrammatically represent the first and second individual photographs taken by a camera placed as shown in Fig. 9.

Fig. 9 is a plan view showing location of camera at a different angle to the line of motion of automobile.

Referring to Fig. 1, which shows one form of camera adapted for use in carrying out my methods. This camera 10 comprises a casing 11 which is divided horizontally into an upper compartment 12 and a lower compartment 13, by means of the plate 14.

Mounted on the front wall of the camera in vertical relation are the lenses 15 and 16 each provided with usual iris diaphragms 17 and 18. The lenses are of matched focal length.

A strip of sensitized film 19 extends across the back of the camera and is in the focal plane of both of the lenses 15 and 16. In front of the film is the curtain 20 of the focal plane shutter used.

Figure 2:
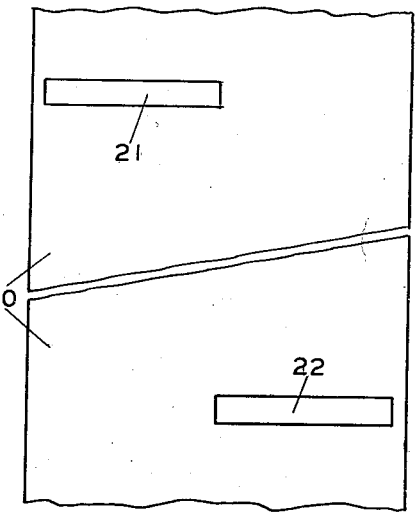
Fig. 2 shows portions of the focal plane curtain used in the camera of Fig. 1.

As shown in Fig. 2 the curtain 20 has two light apertures or light openings 21 and 22. Each of these apertures registers with only one of the compartments of camera 10.

As shown in Fig. 2 the film strip 20 is carried on the spool 23 and after extending across the camera is wound on the spool 24.

The curtain 20 is operated by the take up spool 25 and spring winding spool 26. Suitable guide rolls serve to position the curtain and also the film strip in proper location. Various other details, such as film spool control, curtain winding and release, etc. are all of standard design and accordingly not illustrated. Lens caps may be used or a standard type of safety shutter arranged to block off light during setting of the curtain 20.

A direct view finder of usual design is also provided.

The curtain 20 is only provided with the two openings and has only one setting so that only one exposure time may be obtained. Variations in light conditions are taken care of by settings of the iris diaphragms 17 and 18. The spring tension of the curtain spool 26 is fixed and not adjustable by operator.

The curtain 20 has a sufficient travel or movement so that the apertures are each passed across the film strip exposed in the respective compartments. The apertures are spaced the correct distance, so that at the curtain fixed speed of travel the exposure in one compartment will take place a fixed uniform time interval after the exposure in the other compartment. For example, if the apertures are one-quarter inch in width (measured along the curtain) and it is desired to make an exposure of 1/200 part of a second it follows that the curtain 20 must move across the film at the rate of one-quarter inch in 1/200 part of a second or fifty inches per second.

From this it will be obvious that by spacing the apertures five inches the time interval between exposures will be one-tenth of a second, which is a satisfactory interval to use.

The speed of the exposures must be sufficient to substantially stop the motion of the automobile on the film. Very short focal length lenses may be used to advantage. The camera represented by Fig. 1 is, for illustration, shown much larger than necessary or desirable. Very satisfactory work is being done with lenses of 15 mm. focal length. It will be understood that the pictures actually used are greatly enlarged before the measurements are made.

To practice the method the operator takes a position 25 to 50 feet from the side of the road. The camera is usually held in the hands but may be mounted on a tripod. When an automobile is fully sighted in the finder the shutter is released and the two exposures made. Thus, the first exposure is a manual one and the second exposure takes place automatically at the fixed time interval after the first exposure.

A new section of film is brought into position, the shutter re-set and the operation may be repeated on another automobile.

Referring to Fig. 6 it will be noted that the camera 10 is situated at a view point at ninety degrees to the line of motion 30 of the automobile. If the camera is held steadily and not swung to follow car as it passes (a natural tendency) the individual pictures will appear as shown in Figs. 4 and 5, with similar background details vertically positioned.

The enlarged prints of the photographs are now combined and oriented so that a gauge line 33 will intersect corresponding points in each individual picture.

Lines 34 and 35 are drawn parallel to the gauge line 33 and intersect definite visible points (wheel centers) of the first pictured image of the automobile.

Lines 36 and 37 are drawn parallel to the gauge line 33 and intersect similar definite visible points (wheel centers) of the second pictured image of the automobile.

The lengths 40 and 41 are now measured directly from the photographs and the proportion which their average value bears to the actual wheel base of the automobile is the "scale" of the combination picture.

The lengths 42 and 43 are now measured directly from the combination picture and their average value multiplied by the scale of the picture gives the distance which the automobile has moved during the elapsed time interval.

The actual distance moved and the known time interval elapsed between the photographs furnish the factors from which to calculate the rate of speed or velocity of the automobile.

As an example, referring to Figs. 4 and 5, the average pictured wheel base (40 plus 41 divided by 2) may be measured as one and six-tenths inches. If the actual wheel base of the particular automobile is one hundred and twenty-eight inches, the scale of the combination picture will be one to eighty. If the average length of the pictured distance moved by the automobile is ninety-five hundredths of an inch, the actual distance moved will be eighty times this length or seventy-six inches. Using the known time interval between the photographs (let us assume it to be one-tenth second) we can readily compute the velocity of the automobile, in this example, as being approximately forty-three miles per hour.

As shown in Figs. 4, 5 and 6 the position of the camera is at right angles to the line of motion of the automobile. Under this condition the pictured lengths 40 and 41 will be the same, and also the pictured lengths 42 and 43 will be similar, because the automobile was the same distance from the camera in each of the photographs, and the lenses used have the same focal length.

Referring to Figs. 7, 8 and 9 it will be noted that the camera 10 is positioned at a different angle to the line of motion of the automobile, and in this case, due to variation in the distance from the camera, the image photographs will show different lengths. The use of the average lengths, as explained above, both to obtain the scale of the combined picture and to ascertain the distance moved by the automobile, will compensate for this variation. Because of this important feature of the invention, speed determinations can be accurately made from any viewpoint from which a clear picture of both the visible measuring points can be obtained, the preferred position being at approximately right angles to the line of motion of the automobile.

In case the camera is moved or panorammed between exposures (the very short time interval between photographs avoids most of this trouble) corresponding points in the backgrounds will not be vertically positioned on the film. The method step of combining the individual photographs to define the line of motion, by means of the gauge line, will automatically compensate for this motion of the camera.

Instead of the type of two lens camera described above, it is entirely practical and in many respects even preferable to use the well known spring actuated motion picture camera. In this type of apparatus the film is drawn intermittently to position back of a single lens and a timed shutter opening gives the exposures. If such a camera is set to operate at either 16 or 20 frames per second, either adjacent frames giving respectively 1/16th or 1/20th second interval, or odd numbered frames (1—3—5) may be used to give longer intervals.

It is pointed out that the uniformity of the time interval between the photographs is the factor effecting the accuracy of the results obtained from any camera which may be used. The actual interval of the cameras may be readily measured and used, and obviously may be of any amount which will enable the two images to be photographed in the field of view.

It is not necessary to make prints from the negatives used in speed determinations. The preferred procedure is to use reversible motion picture film (16 mm. is very satisfactory and low in cost) and project the positive images and background details on a screen for purposes of measurement.

This application is a continuation of my co-pending application Serial No. 455,588, filed May 26th, 1930.

I claim:

1. The method of determining the rate of speed of a moving automobile which comprises the photographic recording, from a view point approximately at right angles to the line of motion, of a plurality of pictures of said automobile, taken at a known time interval apart and each picture including the same background; combining the pictures to define the line of motion; using a known dimension of the automobile to ascertain the scale of the combination picture; measuring directly from the combination picture a distance proportional to the distance moved by the automobile and using the distance moved and the known time interval to compute the rate of speed of the automobile.

2. The method of determining the rate of speed of a moving automobile which comprises the photographic recording, with a known time interval, of a plurality of images of said automobile taken from a view point approximately at right angles to the line of motion and in front of the same background; physically combining the photographic records to ascertain the distance moved by said automobile and using said distance and the known time interval between the photographic records to compute the rate of speed of said automobile.

3. The method of determining the rate of speed of a moving automobile which comprises the photographic registering, from a viewpoint approximately at right angles to the line of motion, of an image picture of the side of said automobile in one position in front of a background and after a known time interval registering a second image picture of the side of said automobile in front of the same background; physically combining the backgrounds of the individual pictures; using the size of said images to ascertain the scale of said combination picture; using the position of said images relative to said combined backgrounds to measure directly from said combination picture a distance proportional to the distance moved by said automobile and using said distance and the time interval to compute the rate of speed of said automobile.

4. The method of determining the rate of speed of a moving automobile which comprises the photographic registering, from a viewpoint approximately at right angles to the line of motion, of an image picture of the side of said automobile in one position in front of a background and after a pre-determined time interval automatically registering a second image picture of said side of said automobile in front of the same background; physically combining the backgrounds of the individual pictures; using the size of said images to ascertain the scale of said combination picture; using the position of said images relative to said combined backgrounds to measure directly from said combination picture a distance proportional to the distance moved by said automobile and using said distance moved and the time interval to compute the rate of speed of said automobile.

5. The method of determining the rate of speed of a moving vehicle, having visible parts separated by a known length, which comprises the photographic recording, from a viewpoint approximately at right angles to the line of motion, of an image picture of the side of said vehicle in front of a background and after a known time interval, the photographic recording of a second image picture of said side of said vehicle, in front of the same background; combining the two photographic records in such a manner that lines which intersect said visible parts shown in each of said images, will also intersect corresponding like points in the background of each picture; using the average represented separation of said visible parts to ascertain the scale of the combination picture; measuring directly from said combination picture a distance proportional to the distance moved by said vehicle during said time interval and computing the rate of speed of said vehicle from the distance moved during the said known time interval.

6. The method of determining the velocity of a moving automobile which comprises the photographic recording, from a viewpoint approximately at right angles to the line of motion, of an image picture of said automobile in one position in front of a definite background and after a known time interval, the photographic recording of a second image picture of said automobile taken from the said viewpoint and including the same background in said picture; combining the backgrounds of the two pictures by a gauge line connecting corresponding points in each background to form a combination picture; using the size of said images to ascertain the scale of said combination picture, using the position of said images relative to said gauge line to measure directly from said combination picture a distance proportional to that moved by said automobile and using said distance and the known time interval between the recording of the first and second pictures to compute the velocity of said automobile.

7. The method of determining the velocity of a moving automobile which comprises the photographic recording from a viewpoint approximately at right angles to the line of motion, of an image picture of said automobile in one position in front of a background and after a known time interval, the photographic recording of a second image picture of said automobile, taken from the same viewpoint, and including the same background in said picture; connecting corresponding points in each of the pictured backgrounds by a gauge line which intersects a definite part, like a wheel center, as recorded on one image picture; drawing lines parallel to said gauge line and intersecting other definite parts of each image picture; measuring the separation of said lines and comparing said measurements with the known separation of said definite parts of said automobile to determine both the scale of said pictures and the distance moved by said automobile; and using said distance and the known time interval between the recording of the pictures, to compute the velocity of said automobile.

8. The method of determining the distance between two positions of a moving automobile which comprises the photographic recording, from a viewpoint approximately at right angles to the line of motion, of an image picture of said automobile in its first position, in front of a definite background and thereafter recording from the same viewpoint an image picture of said automobile in its second position, including a portion of the same background in each picture; combining the backgrounds of the two pictures to form a combination picture, using the size of said images to ascertain the scale of said combination picture, using the position of said images relative to said background to measure directly from said combination picture a distance proportional to that moved by said automobile and using said measured distance and the scale of said combination picture to determine the actual distance between the said two positions of said moving automobile.

9. The method of determining the distance between two positions of a moving automobile which comprises the photographic recording, from a viewpoint approximately at right angles to the line of motion, of an image picture of said automobile in its first position, in front of a definite background and thereafter recording from the same viewpoint an image picture of said automobile in its second position; including a portion of the same background in said picture; combining the backgrounds of the two pictures by a gauge line connecting corresponding points in each background to form a combination picture, using the size of said images to ascertain the scale of said combination picture, using the position of said images relative to said gauge line to measure directly from said combination picture a distance proportional to that moved by said automobile and using said measured distance and the scale of said combination picture to determine the actual distance between the said two positions of said moving automobile.

10. The method of determining the velocity of a moving automobile which comprises the photographic recording, from a viewpoint located to the side of the line of motion, of a plurality of pictures of the side of said automobile, taken at a known time interval apart and each picture including the same background; combining the pictures to define the line of motion; using a known dimension, as pictured in the side views of the automobile to ascertain the scale of the combination picture; measuring directly from the combination picture a distance proportional to the distance moved by the automobile and using the distance moved and the known time interval to compute the velocity of the automobile.

11. The method of determining the distance between two positions of a moving automobile which comprises the photographic recording, from a viewpoint located to the side of the line of motion, of a plurality of pictures of the side of said automobile, each picture including the same background; combining the pictures to define the line of motion; using a known dimension, as pictured in the side views of the automobile to ascertain the scale of the combination picture; measuring directly from the combination picture a distance proportional to the distance moved by said automobile and using said measured distance and the scale of said combination picture to determine the actual distance between the said two positions of said moving automobile.

MATHIAS R. KONDOLF.